United States Patent
Kayano et al.

(10) Patent No.: US 9,865,849 B2
(45) Date of Patent: Jan. 9, 2018

(54) ASSEMBLED BATTERY AND METHOD FOR MANUFACTURING ASSEMBLED BATTERY

(71) Applicant: NISSAN MOTOR CO., LTD., Yokohama-shi, Kanagawa (JP)

(72) Inventors: Shigeki Kayano, Yokohama (JP); Tatsunori Narikiyo, Atsugi (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 246 days.

(21) Appl. No.: 14/441,073

(22) PCT Filed: Oct. 31, 2013

(86) PCT No.: PCT/JP2013/079516
§ 371 (c)(1),
(2) Date: May 6, 2015

(87) PCT Pub. No.: WO2014/073443
PCT Pub. Date: May 15, 2014

(65) Prior Publication Data
US 2015/0303415 A1    Oct. 22, 2015

(30) Foreign Application Priority Data
Nov. 9, 2012 (JP) ................................ 2012-247634

(51) Int. Cl.
*H01M 2/10* (2006.01)
*H01M 2/20* (2006.01)

(52) U.S. Cl.
CPC ....... *H01M 2/1016* (2013.01); *H01M 2/1022* (2013.01); *H01M 2/1061* (2013.01);
(Continued)

(58) Field of Classification Search
CPC .. H01M 2/206; H01M 2/1077; H01M 2/1061; H01M 2/204; H01M 2/1022; H01M 2/1072; H01M 2/202; H01M 2/1016
See application file for complete search history.

(56) References Cited

U.S. PATENT DOCUMENTS

| 2011/0104556 A1* | 5/2011 | Kim | H01M 2/1077 429/160 |
| 2012/0003520 A1* | 1/2012 | Lee | H01M 2/1022 429/83 |

(Continued)

FOREIGN PATENT DOCUMENTS

| JP | 3169685 U | 7/2011 |
| JP | 2011-171192 A | 9/2011 |

(Continued)

*Primary Examiner* — Muhammad S Siddiquee
(74) *Attorney, Agent, or Firm* — Foley & Lardner LLP

(57) ABSTRACT

A battery pack includes: cells, and electrode tabs including a positive electrode tab and a negative electrode tab which are connected with the power generation element, and which are provided to protrude from end portions of the outer member; frame members each including a front surface and a back surface on which the pair of the cells are mounted; conductive members each of which is disposed on the frame member, and each of which electrically connects the electrode tabs of the pair of the cells; and bus bars each of which electrically connects the conductive members disposed on the frame members of the plurality of the stacked frame members, and which are adjacent in a stacking direction.

17 Claims, 14 Drawing Sheets

(52) U.S. Cl.
CPC ....... *H01M 2/1072* (2013.01); *H01M 2/1077* (2013.01); *H01M 2/202* (2013.01); *H01M 2/204* (2013.01); *H01M 2/206* (2013.01)

(56) References Cited

U.S. PATENT DOCUMENTS

| | | | |
|---|---|---|---|
| 2012/0040223 A1* | 2/2012 | Odumodu | H01M 2/1077 429/120 |
| 2013/0236751 A1 | 9/2013 | Seong et al. | |
| 2014/0023909 A1* | 1/2014 | Suzuki | H01M 2/206 429/158 |

FOREIGN PATENT DOCUMENTS

| | | |
|---|---|---|
| JP | 2011-181369 A | 9/2011 |
| KR | 20100066712 A | 6/2010 |

* cited by examiner (a)

(b)

120

(a)

(b)

ASSEMBLED BATTERY AND METHOD FOR MANUFACTURING ASSEMBLED BATTERY

TECHNICAL FIELD

This invention relates to a battery pack and a method of manufacturing the battery pack.

BACKGROUND ART

Conventionally, there is a battery pack which is formed by stacking a plurality of battery modules including power generation elements. In this case, there is a structure in which a pair of fixing members which have frame shapes sandwiches and holds power collection tabs of a laminate type battery.

PRIOR ART DOCUMENT

Patent Document

Patent Document 1: Japanese Utility Model registration No. 3169685

SUMMARY OF THE INVENTION

Problems which the Invention is Intended to Solve

However, in the structure of the above-described patent document, it is necessary that the holes formed in the power collection tab is positioned to holes formed in fixing tools, and adjacent holes of the fixing tools, by bending the power collection tabs. In this case, in the manufacturing operation of the battery pack, there are many troublesome of the handling of the battery pack. It is not appropriate to the mass production.

It is, therefore, an object of the present invention devised to solve the above-described problems, and to ease the handling of the battery pack, and a method of manufacturing the battery.

Means for Solving the Problem

For attaining the above-described object, a battery pack according to the present invention includes cells, frame members, the conductive members, and bus bars. Each of the cells includes the battery main body which is formed by receiving a power generation element within an outer member; and electrode tabs including the positive electrode tab and the negative electrode tab which are connected to the power generation element, and which are provided to protrude from the end portions of the outer member. The pair of the cells are disposed on the front surface and the back surface of the one of the frame members. The conductive member is disposed to the frame member. Each of the conductive members electrically connects the electrode tabs of the pair of the cells. Each of the bus bars electrically connects the conductive members disposed to the frame members of the plurality of the stacking frame members, which are adjacent to each other in the stacking direction.

For attaining the above-described object, in a method of manufacturing a battery pack, there are prepared cells each including a battery main body which is formed by receiving a power generation element within an outer member, and electrode tabs including a positive electrode tab and a negative electrode tab which are connected to the power generation element (not shown), and which are provided to protrude from the end portions of the outer member respectively. The method of manufacturing the battery pack includes a cab holding process, an electrode tab connecting process, and a conductive member connecting process. In the cell holding process, the pair of the cells are disposed, respectively, on the front surface and the hack surface of the frame member. In the electrode tab connecting process, each of the conductive members disposed to the frame members connects the electrode tabs of the pair of the cells. In the conductive member connecting process, each of the bus bars electrically connects the conductive members of the frame members of the plurality of the stacked frame members, which are adjacent to each other in the stacking direction.

DESCRIPTION OF EMBODIMENTS

Figure 1:
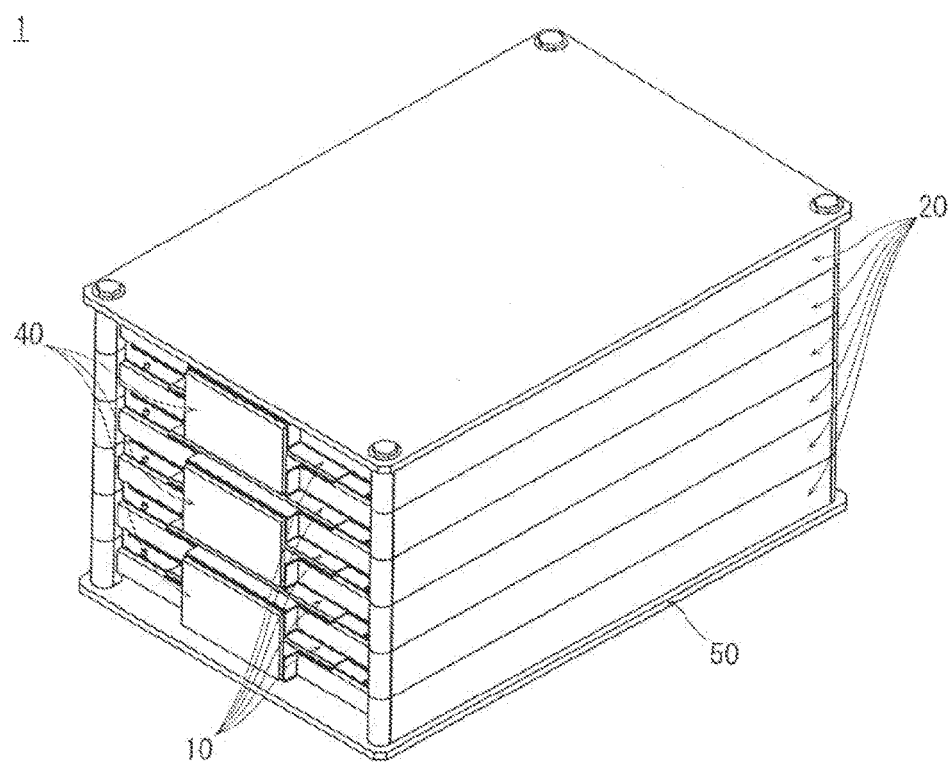
FIG. 1 is a perspective view showing a battery pack according to a first embodiment.

Hereinafter, first to third embodiments according to the present invention are illustrated with reference to the attached drawings. In explanations of the drawings, the same elements have the same symbols, and repetitive explanations are omitted. Size and ratio of the respective members in the drawings are exaggerated for the explanation. Accordingly, the size and the ratio may be different from actual size and actual ratio.

First Embodiment

A battery pack 1 according to the first embodiment and a method of manufacturing this battery pack 1 are illustrated with reference to FIG. 1 to FIG. 6.

Figure 2:
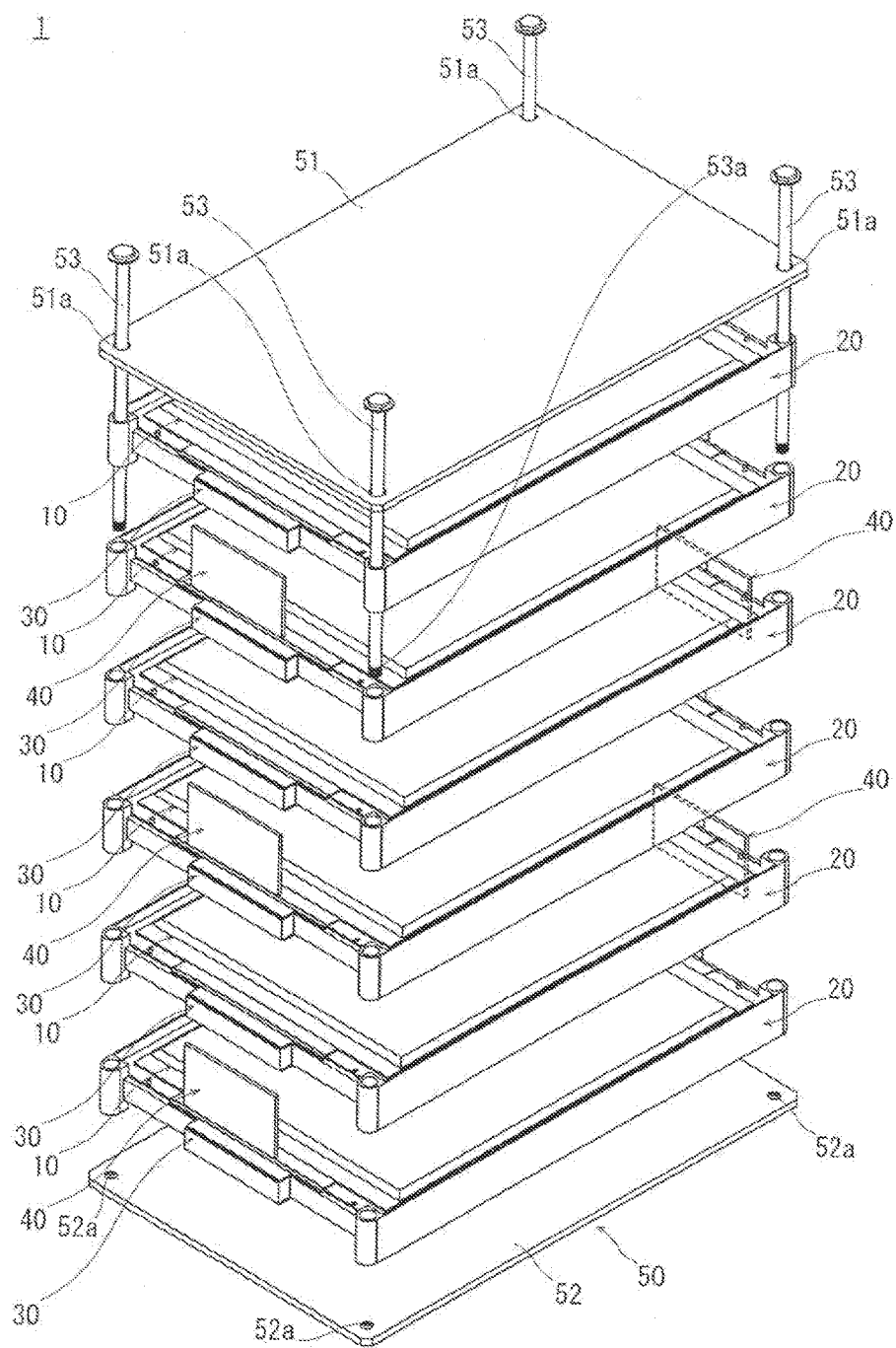
FIG. 2 is an exploded perspective view showing a state where the battery pack 1 according to the first embodiment is exploded.
Figure 3:
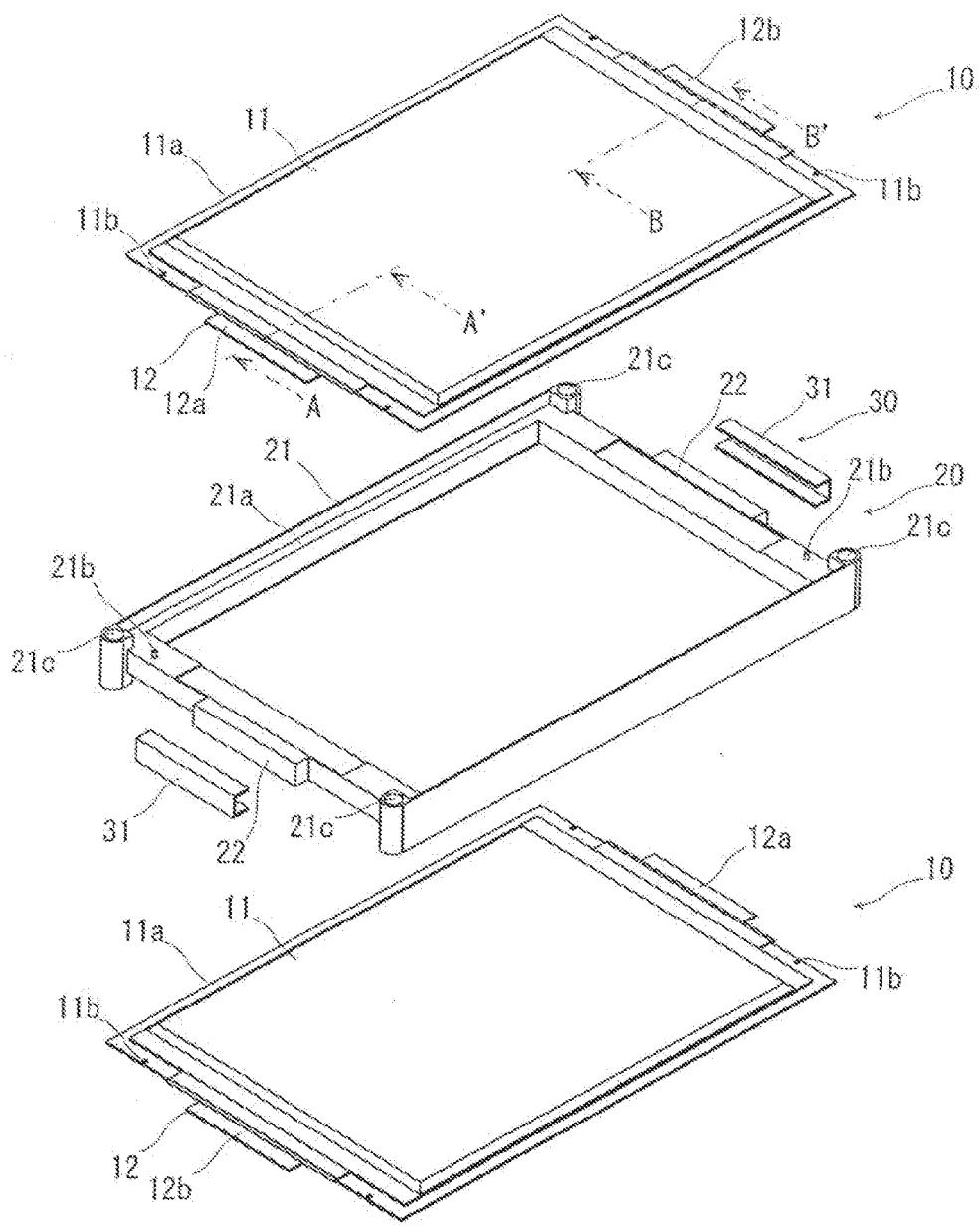
FIG. 3 is an exploded perspective view showing a state in which a battery module of the battery pack according to the first embodiment is exploded.
Figure 4:
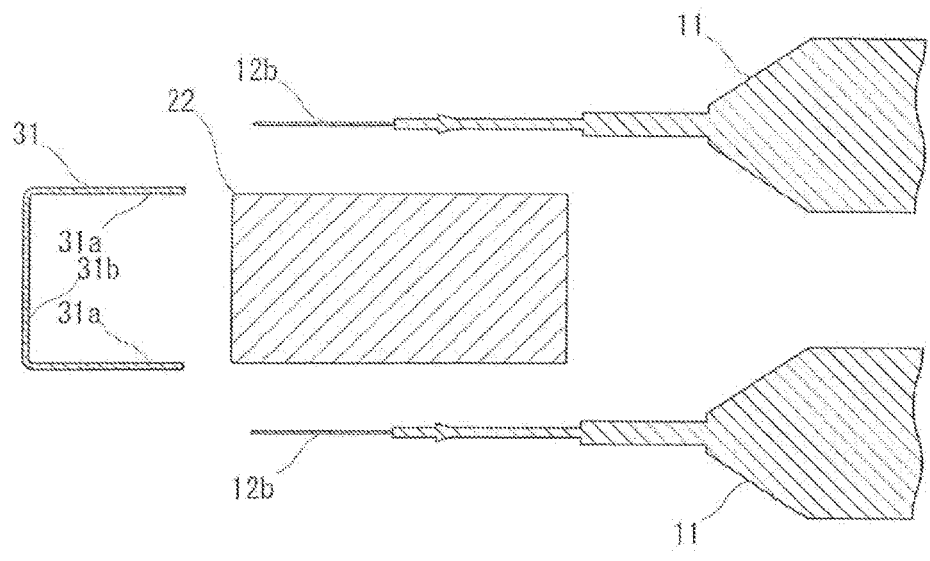
FIG. 4 are exploded end elevation views showing a state in which a main part of the battery module of the battery pack according to the first embodiment is exploded.
Figure 4:
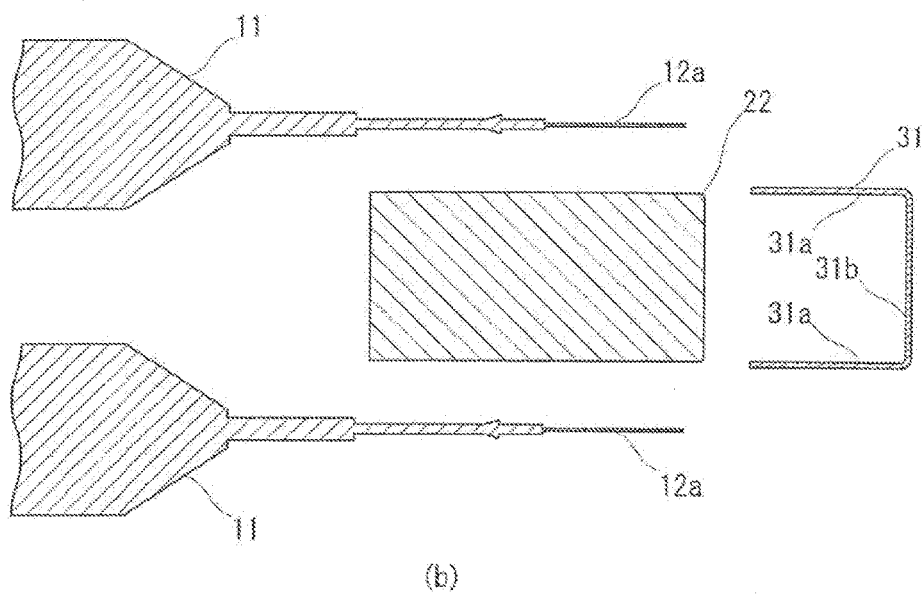
Figure 5:
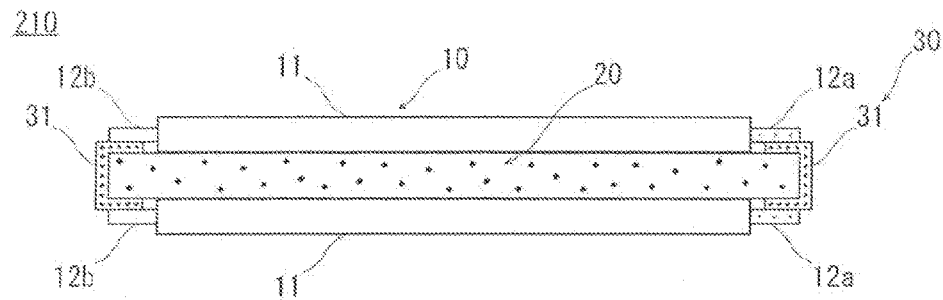
FIG. 5 is a schematic view showing a parallel member of the battery pack according to the first embodiment.
Figure 6:
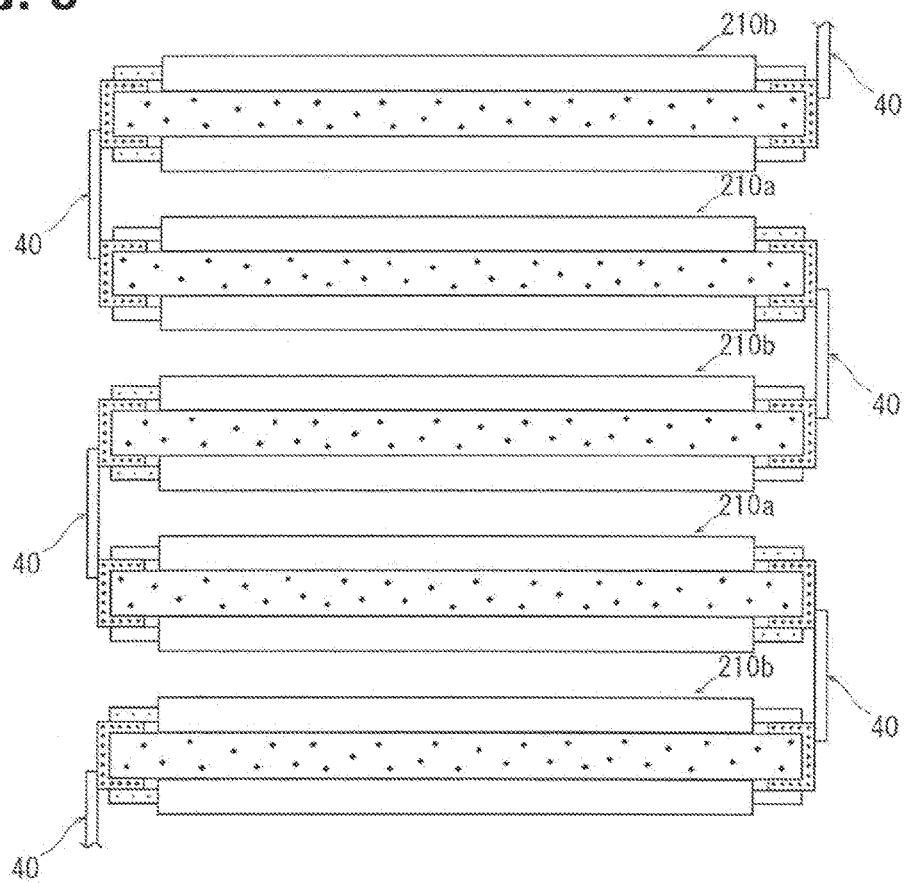
FIG. 6 is a schematic view showing a state where a plurality of the parallel members of the battery pack according to the first embodiment are connected in series.

FIG. 1 is a perspective view showing the battery pack 1. FIG. 2 is an exploded perspective view showing a state where the battery pack 1 is exploded. FIG. 3 is an exploded perspective view showing a state in which a battery module 110 of the battery pack 1 is exploded. FIG. 4 is an end elevation showing a state in which a main part of the battery module 110 of the battery pack 1 is exploded. FIG. 4(a) is an end elevation showing a portion taken along a line A-A' of FIG. 3. FIG. 4(b) is an end elevation showing a portion taken along a line B-B' of FIG. 3. FIG. 5 is a schematic view showing a parallel member 210 of the battery pack 1. FIG. 6 is a schematic view showing a state where a plurality of the parallel members 210 of the battery pack 1 are connected in series (with each other).

As shown in FIG. 1 and FIG. 2, the battery pack (assembled battery) 1 includes cells (batteries) 10, frame members 20, conductive members 30, bus bars 40, and a tightening member 50. In the battery pack 1, a pair of the cells 10 are disposed on a front surface and a back surface of one of the frame members 20 to confront each other. The pair of the cells 10 are electrically connected with each other through one of the conductive members 30. Each of the bus bars 40 electrically connects the conductive members 30 disposed on the plurality of the frame members 20. The tightening member 50 integrally fixes the plurality of the frame members 20 which are stacked.

As shown in FIG. 3 and FIG. 4, the cell 10 includes a battery main body 11 which has a flat shape, and in which power generation elements (not shown) are received within an outer member 11a formed by a flexible film-shaped member such as a laminate film; and electrode tabs 12 including a positive electrode tab 12a and a negative electrode tab 12b which have plate shapes, which are connected to the power generation elements within the outer member 11a, and which protrude, respectively, from end portions of the outer member 11a to the outside. Specifically, the cell 10 is, for example, lithium ion secondary battery, polymer-lithium battery, nickel-hydrogen battery, nickel-cadmium battery. The cell 10 is formed by closing the power generation element which charges and discharges the electric power by covering the power generation elements with the bag-shaped outer member 11 formed by joining an outer circumference edge of a flexible film-shaped member. The power generation elements are constituted by moreover stacking a plurality of members formed by stacking the positive electrode and the negative electrode through a separator. Through holes 11b are formed at two corners of the outer member 11a of the cell 10 which are opposite sides (diagonal sides). Positioning protrusions 21b provided to a battery main body holding portion 21 of the frame member 20 are inserted into this through holes 11b.

As shown in FIG. 3 and FIG. 4, the pair of the cells 10 are disposed on the front surface and the back surface of the frame member 20. The frame member 20 is made from reinforced plastics. The frame member 20 includes a holding portion 21a which is formed into a frame shape penetrating in the direction in which the cells 10 are stacked. Double sided tapes are adhered on the front surface and the back surface of the holding portion 21a. With this, the battery main bodies 11 of the pair of the cells 10 mounted on the front surface and the back surface of the holding portion 21a are held, respectively, on the frame member 20. The frame member 20 is not limited to the penetrating frame shape. The frame member 20 may have a shape which have recessed portions which are formed on both surfaces thereof, and which hold the pair of the cells 10, respectively. The battery main body holding portion 21 includes the positioning protrusion 21b. The positioning protrusion 21b is inserted into the through hole 11b of the outer member 11a of the cell 10. The electrode tab connection portions 22 are provided to protrude from the both ends of the holding portion 21a. The electrode tab connection portions 22 protrude in the outward directions which are directions crossing the stacking direction of the cells 10. The electrode tab connection portions 22 hold conductive member 30 in a state where the conductive members 30 each having a U-shape are inserted respectively. The frame members 20 are integrally tightened by tightening bolts 53 (described later) inserted in the stacking direction after the frame members 20 are stacked with each other.

As shown in FIG. 3 and FIG. 4, the conductive member 30 is disposed on the electrode tab connection portion 22 of the frame member 20 so as to electrically connect the pair of the electrode tabs 12 of the cell 10. The conductive material 31 of the conductive member 30 is made of, for example, copper alloy. The conductive material 31 of the conductive member 30 is formed into a U-shape. The conductive material 31 includes two connection portions 31a which have plate shapes extending in the extension direction of the electrode tabs 12 of the cell 10. The connection portions 31a of the conductive material 31 are connected through an extension portion 31b, so that the conductive material 31 is formed into the U-shape. As shown in FIG. 3 and FIG. 4(a), the positive electrode tabs 12a of the pair of the cells 10 are electrically connected with each other through the conductive material 31. Similarly, as shown in FIG. 3 and FIG. 4(b), the negative electrode tabs 12b of the pair of the cells 10 are electrically connected with each other through another conductive material 31.

As shown in FIG. 2, the bus bar 40 electrically connects the conductive members 30 which are disposed on two of the frame members 20 of the plurality of the stacked frame members 20 which are adjacent to each other in the stacking direction. The bus bar 40 is made of, for example, copper alloy. The bus bar 40 is formed into a plate shape. The bus bars 40 are alternately disposed on the both ends of the adjacent frame members 20 so as to electrically connect in series, the pair of the cells 10 mounted on one of the frame members 20. The bus bars 40 and the conductive members 30 are joined by welding by locally irradiating the laser at the abutting portions of the bus bar 40 and the conductive member 30.

As shown in FIG. 1 and FIG. 2, the tightening member 50 integrally tightens the plurality of the stacked frame members 20. The tightening member 50 includes an upper plate 51, a lower plate 52, and a plurality of tightening bolts 53. The upper plate 51 and the lower plate 52 are made of, for example, metal. Each of the upper plate 51 and the lower plate 52 is formed into a plate shape. The upper plate 51 includes insertion holes 51a which are formed at four corners of the upper plate 51, and through which one of the tightening bolts 53 is inserted. The tightening bolts 53 are inserted through the upper plate 51 to the insertion holes 21c of the plurality of the frame members 20, and then screwed into the screw grooves 52a of the lower plate 52.

As shown in FIG. 5, the pair of the conductive members 31 connect the positive electrode tabs 12a which are adjacent to each other in the stacking direction of the frame members 20, and connect the negative electrode tabs 12b. With this, the pair of the conductive members 31 electrically connect the pair of the cells 10 in the parallel manner. The parallel member (section) 210 is constituted by the pair of the cells 10, one of the frame members 20, and the conductive members 30 as shown in FIG. 5. The parallel member 210 corresponds to one example of a battery module.

As shown in FIG. 6, it is possible to electrically dispose the plurality of the parallel members 210 in the electric series manner. Specifically, one parallel member 210a and the other parallel member 210b are stacked. The other parallel member 210b is stacked on the one parallel member 210a in a state where the other parallel member 210b is rotated, for example, 180 degrees in a direction which crosses the stacking direction of the frame members 20, with respect to the one parallel member 210a (that is, in a state where the other parallel member 210b is rotated 180 degrees about the stacking direction which is as the rotation axis). The bus bar 40 electrically connects the conductive member 30 electrically connecting the positive electrode tabs 12a of the one parallel member 210a, and the conductive member 30 electrically connecting the negative electrode tabs 12b of the other parallel member 210b.

By the battery pack 1 according to the above-described embodiment, and the method of manufacturing this battery pack 1, the following operations and effects are obtained.

The battery pack 1 includes the cells 10, the frame members 20, the conductive members 30, and the bus bars 40. Each of the cells 10 includes the battery main body 11 which is formed by receiving the power generation element (not shown) within the outer member 11a; and the electrode tabs 12 including the positive electrode tab 12a and the negative electrode tab 12b which are connected to the power generation element (not shown), and which are provided to protrude from the end portions of the outer member 11a. The pair of the cells 10 are disposed on the front surface and the back surface of the one of the frame members 20. The conductive member 30 is disposed to the frame member 20. Each of the conductive members 30 electrically connects the electrode tabs 12 of the pair of the cells 10. Each of the bus bars 40 electrically connects the conductive members 30 disposed to the frame members 20 of the plurality of the stacking frame members 20, which are adjacent to each other in the stacking direction.

Similarly, in the method of manufacturing the battery pack 1, there are prepared the cells 10 each Including the battery main body 11 which is formed by receiving the power generation element (not shown) within the outer member 11a, and the electrode tabs 12 including the positive electrode tab 12a and the negative electrode tab 12b which are connected to the power generation element (not shown), and which are provided to protrude from the end portions of the outer member 11a respectively. The method of manufacturing the battery pack 1 includes a cell holding process, an electrode tab connecting process, and a conductive member connecting process. In the cell holding process, the pair of the cells 10 are disposed, respectively, on the front surface and the back surface of the frame member 20. In the electrode tab connecting process, each of the conductive members 30 disposed to the frame members 20 connects the electrode tabs 12 of the pair of the cells 10. In the conductive member connecting process, each of the bus bars 40 electrically connects the conductive members 30 of the frame members 20 of the plurality of the stacked frame members 20, which are adjacent to each other in the stacking direction.

By the thus-constructed battery pack 1 and the method of manufacturing this battery pack 1, the pair of the cells 10 are disposed on one of the frame members 20. The bus bar 40 connects the conductive members 30 which are adjacent to each other, in a state where the conductive members 30 connect the electrode tabs 12 of the cell 10. By this simple structure, it is possible to electrically connect the pair of the cells 10, and thereby to ease the handling at a time at which the battery pack 1 is formed.

Moreover, by the above-described structure, the pair of the cells 10 are mounted on one of the frame members 20. Then, one of the conductive members 30 connects the electrode tabs 12 of the pair of the cells 10, Accordingly, even when the external force is acted to the battery pack 1 after the components are assembled. The pair of the cells 10 are difficult to be electrically opened or short-circuited. That is, in the assembled battery pack 1, the electrode tabs 12 of the cell 10 are not readily deformed even when the external force is acted. It is possible to ensure the electric reliability. In this way, even when the external force is acted to the battery pack 1 after the components are assembled. The pair of the cells 10 are difficult to be electrically opened and short-circuited. It is possible to ensure the electric reliability.

Furthermore, by the above-described structure, it is possible to readily assemble the battery pack 1 independently of the size error and the positioning accuracy of the members. Specifically, the electrode tabs 12 are not directly connected with each other, and the electrode tabs 12 are indirectly connected with each other through the conductive members 30. Accordingly, even when the electrode tabs 12 of the pair of the cells 10 are relatively departed from each other in the extension direction of the electrode tabs 12, it is possible to assemble the battery pack 1 without consideration of the relative position deviation of the electrode tabs 12. Similarly, the bus bars 40 are independently provided. Accordingly, even when the bus bars 40 electrically connecting the conductive members 30 are relatively deviated from each other, it is possible to assemble the battery pack 1 without consideration of the relative position deviation of the bus bars 40. In this way, even if the number of the components is increased, it is possible to assemble independently of the errors of the shape and the positioning errors of the various members constituting the battery pack 1. When the members are stacked, the remarkably large effects can be attained.

Moreover, the positive electrode tabs 12a which are adjacent to each other in the stacking direction of the frame members 20 are connected through the one conductive member 30. The negative electrode tabs 12b are connected through the other conductive member 30. With this, the parallel member 210 in which the pair of the cells 10 are electrically connected in parallel with each other may be constituted.

Similarly, in the method of manufacturing the battery pack 1, in the electrode tab connecting process, the positive electrode tabs 12*a* which are adjacent to each other in the stacking direction of the frame members 20 may be connected with each other by using the conductive members 30. Moreover, the negative electrode tabs 12*b* which are adjacent to each other in the stacking direction of the frame members 20 may be connected with each other.

By the thus-constructed battery pack 1 and the method of manufacturing this battery pack 1, it is possible to constitute the parallel member 210 by electrically connecting the pair of the cells 10 in the parallel manner by the above-described simple structure. Accordingly, it is possible to remarkably ease the handling when the battery pack 1 is formed.

Moreover, even when the relative error of the position of the pair of the cells 10 mounted on the frames 20 are generated, it is possible to absorb the relative positon deviation, and to readily connect the electrode tabs 12 which have the same polarity, and which are provided to the pair of the cells 10 through the conductive member 30. Accordingly, it is possible to constitute the parallel member 210 by using the pair of the cells 10, and to remarkably readily form the parallel circuit.

Furthermore, the apparatus may be constituted by the one parallel member 210*a*, and the other parallel member 210*b* which is stacked on the one parallel member 210*a*. The other parallel member 210*b* is stacked on the one parallel member 210*a* in a state the other parallel member 210*b* is rotated with respect to the one parallel member 210*a* so that the conductive member 30 electrically connecting the positive electrode tabs 12*a* if the one parallel member 210*a*, and the conductive member 30 electrically connecting the negative electrode tabs 12*b* of the other parallel member 210*b* are adjacent to each other in the stacking direction; each of the bus bars 40 electrically connects, in series, the conductive member 30 electrically connecting the positive electrode tabs 12*a* of the one parallel member, and the conducive member 30 electrically connecting the negative electrode tabs 12*b* of the other parallel member 210*b*.

Similarly, in the method of manufacturing the battery pack 1, the other parallel member 210*b* is stacked on the one parallel member 210*a* in a state the other parallel member 210*b* is rotated with respect to the one Parallel member 210*a* so that the conductive member 30 electrically connecting the positive electrodes tabs 12*a* of the one member 210*a*, and the conductive member 30 electrically connecting the negative electrode tabs 12*b* of the other parallel member 210*b* are adjacent to each other in the stacking direction. In the conductive member connecting process, the conductive member 30 electrically connecting the positive electrode tabs 12*a* of the one parallel member 210*a*, and the conductive member 30 electrically connecting the negative electrode tabs 12*b* of the other parallel member 210*b* are electrically connected in series with each other by using the bus bar 40.

By the thus-constructed battery pack 1 and the method of manufacturing this battery pack 1, it is possible to connect in series the pairs of the cells 10 which are connected in parallel with each other. In accordance with the required voltage value. Accordingly, it is possible to remarkably ease the handling when the battery pack 1 is formed.

Moreover, the frame members 20 may have a frame shape penetrating through so that the pair of the cells 10 directly confront each other.

By the thus-constructed battery pack 1, in a state where the pair of the cells 10 are disposed near each other, or abutted on each other, it is possible to hold the pair of the cells 10 by one of the frame members 20. Accordingly, it is possible to stack the pair of the cells 10 at the high density. Furthermore, when the frame members 20 are formed, processing of penetrating through the both surfaces is easier than processing of forming the recessed portions on the both surfaces. Consequently, it is possible to suppress the manufacturing cost of the frame members 20. Moreover, it is possible to decrease the weight.

First Variation of First Embodiment

A battery pack 1 according to a first variation of the first embodiment, and a method of manufacturing that battery pack 1 are illustrated with reference to FIG. 7 to FIG. 10.

Figure 7:
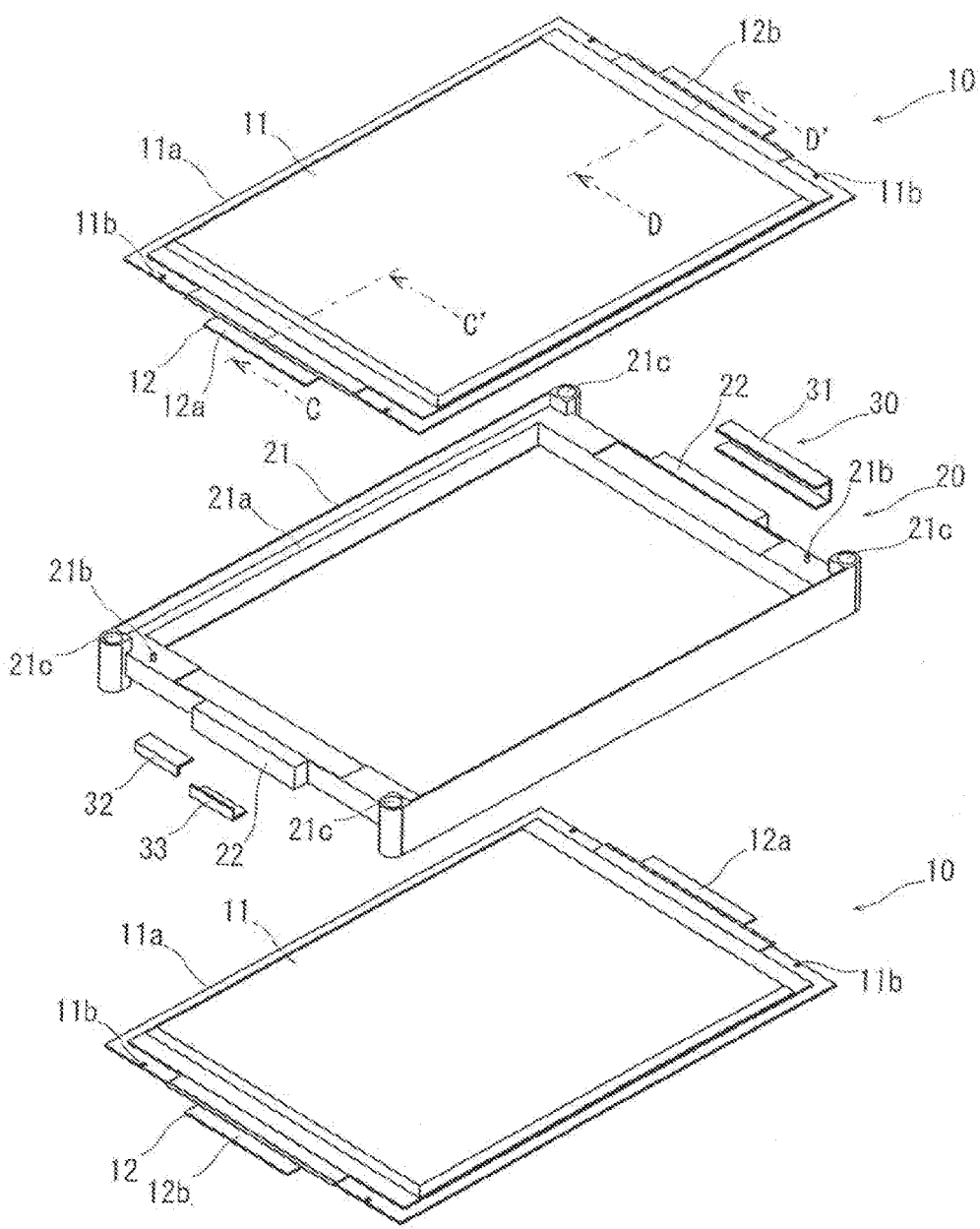
FIG. 7 is an exploded perspective view showing a state where the battery module of the battery pack according to a first variation of the first embodiment is exploded.
Figure 8:
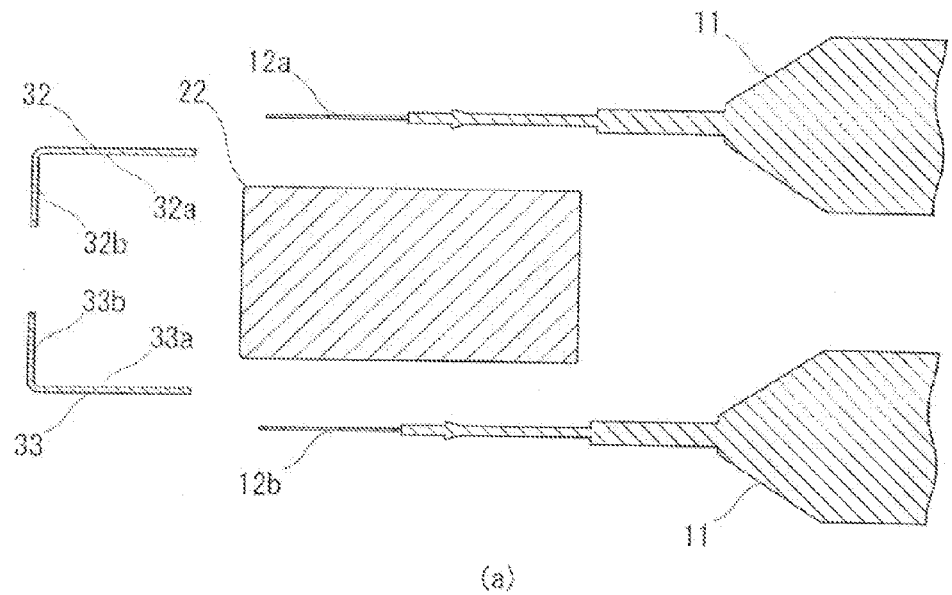
FIG. 8 are exploded end elevation views showing a state where a main part of the battery module of the battery pack according to a first variation of the first embodiment is exploded.
Figure 8:
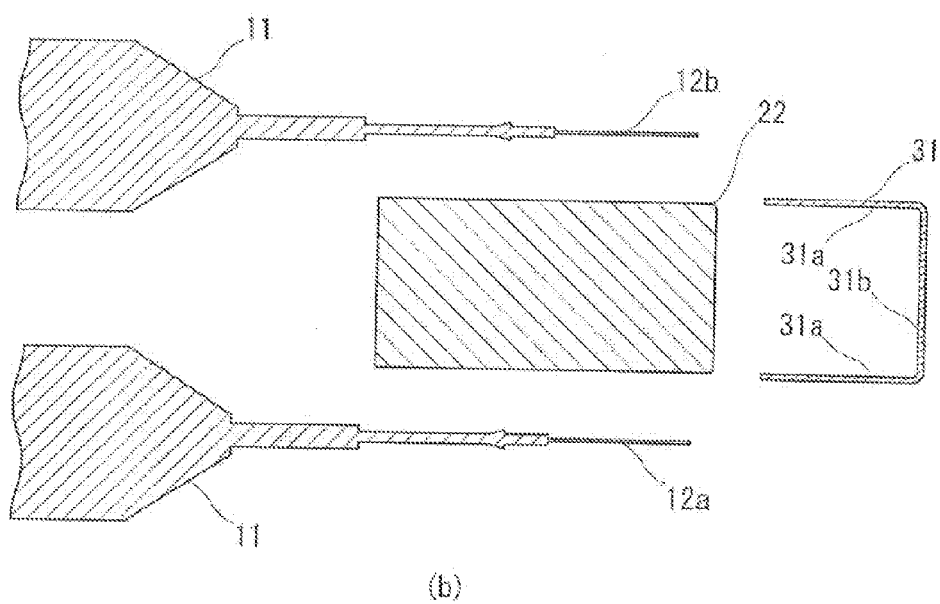
Figure 9:
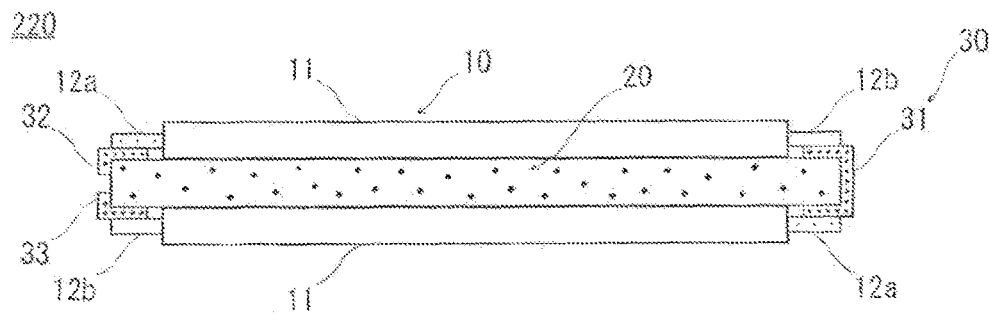
FIG. 9 is a schematic view showing a series member of the battery pack according to the first variation of the first embodiment.
Figure 10:
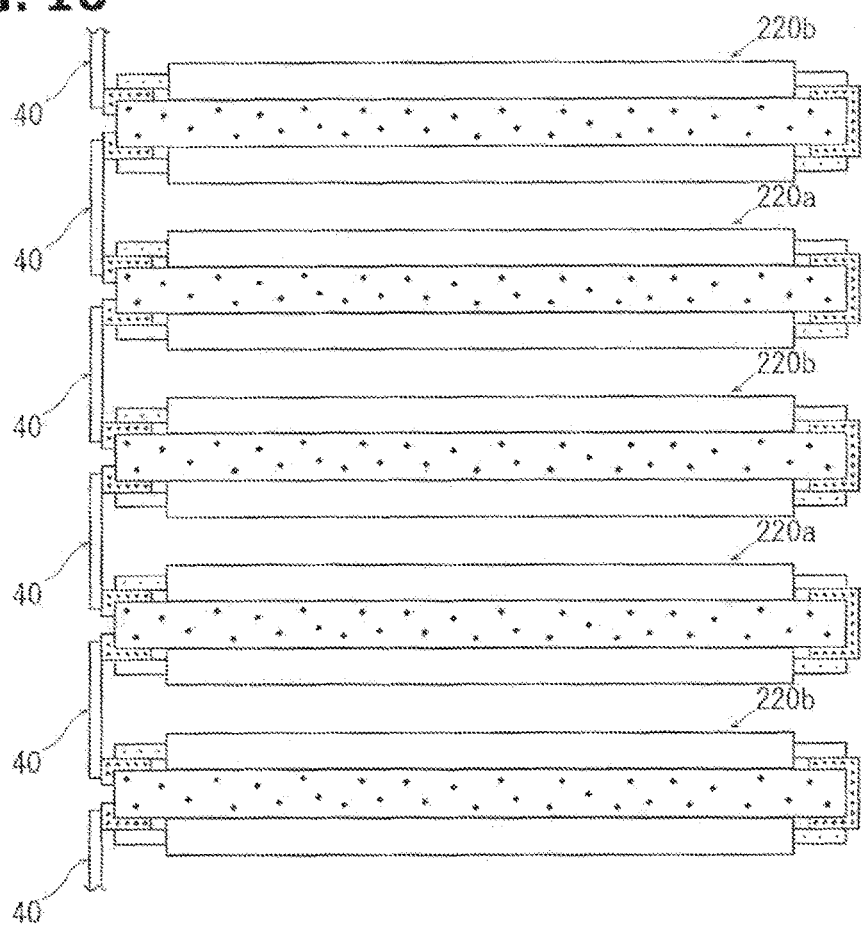
FIG. 10 is a schematic view showing a state where a plurality of the series members of the battery pack according to the first variation of the first embodiment are connected in series.

FIG. 7 is an exploded perspective view showing a battery module 120 of the battery pack 1 which is exploded. FIG. 8 is an exploded end elevation view showing a state in which a main part of the battery module 120 of the battery pack 1 is exploded. FIG. 8(*a*) is an end elevation showing a part taken along a line C-C' of FIG. 7. FIG. 8(*b*) is an end elevation showing a part taken along a line D-D' of FIG. 7. FIG. 9 is a schematic view showing a series member of the battery pack 1. FIG. 10 is a schematic view showing a state where the plurality of the series members 220 of the battery pack 1 are connected in series.

In the battery pack 1 according to the first variation of the first embodiment, the pair of the cells 10 are not electrically connected in parallel. The pair of the cells 10 are electrically connected in series, unlike the structure of the battery pack 1 according to the above-described first embodiment.

In the first variation of the first embodiment, the structure identical to those of the above-described first embodiment have the same symbols, and the above-described explanations are omitted.

As shown in FIG. 7 and FIG. 8, the conductive member 30 of the battery pack 1 includes the conductive members 32 and 33 in addition to the above-described conductive members 31. The conductive members 32 and 33 are made of, for example, copper alloy. Each of the conductive members 32 and 33 is formed into an L-shape. Each of the conductive members 32 and 33 has a longitudinal length and a height which are restricted so as not to be electrically connected with each other even when the conductive members 32 and 33 are disposed to be adjacent to the electrode tab connection portion 22 of the frame member 20.

Each of the conductive members 32 and 33 is disposed to one of the electrode tab connection portion 22 provided to the frame member 20. In particular, the conductive member 32 has an L-shaped bending portion which is disposed to direct in the upward direction in FIG. 7 or FIG. 8(*a*). The conductive member 32 is abutted on the positive electrode tab 12*a* of the one of the pair of the cells 10 which is positioned at the upper portion. The conductive member 33 has an L-shaped bending portion which is disposed to direct in the downward direction in FIG. 7 or FIG. 8(*a*). The conductive member 33 is abutted on the negative electrode tab 12*b* of one of the pair of the cells 10 which is positioned at the lower portion. As shown in FIG. 7 and FIG. 8(*b*), the conductive member 31 is disposed to the other of the electrode tab connection portions 22 which is provided to the frame members 20, so as to confront the conductive member 32 and 33.

As shown in FIG. 9, the conductive member 31 is connected to the positive electrode tab 12*a* and the negative electrode tab 12*b* which are adjacent to each other in the stacking direction of the frame members 20, so as to electrically connect the pair of the cells 10 in series. The pair of the cells 10, the frame members 20 and the conductive members 30 which are shown in FIG. 9 constitute the series member. The series member 220 constitutes one example of the battery module.

As shown in FIG. 10, it is possible to electrically dispose the plurality of the series members 220 in series. In particular, one series member 220a and the other series member 220b are stacked with each other. The bus bar 40 electrically connects the conductive member 30 electrically connected with the positive electrode tab 12a of the one series member 220a, and the conductive member 30 electrically connected with the negative electrode tab 12b of the other series electrode tab 12b.

By the above-described battery pack 1 according to the first variation of the first embodiment, and the method of manufacturing this battery pack 1, the following effects and operation can be attained in addition to the effects and the operations according to the first embodiment.

The positive electrode tab 12a and the negative electrode tab 12b which are adjacent to each other in the stacking direction of the frame members 20 are connected through the conductive member 30, so as to constitute the series member 220 in which the pair of the cells 10 are electrically connected in series.

Similarly, in the method of manufacturing the battery pack 1, in the electrode tab connecting process, by using the conductive member 30, the positive electrode tab 12a and the negative electrode tab 12b which are adjacent to each other in the stacking direction of the frame members 20 may be connected with each other. The pair of the cells 10 are connected in series to constitute the series member 220.

By the thus constructed battery pack 1, and the method of manufacturing the battery pack 1, by the above-described simple structure, it is possible to electrically connect the pair of the cells 10 in series, so as to constitute the series member 220. Accordingly, it is possible to remarkably ease the handling of the battery pack 1.

Moreover, even when the position of the pair of the cells 10 mounted on the frame members 20 have an error, it is possible to absorb that error, and to readily connect the electrode tabs 12 which have the different electrodes, and which are provided through the conductive members 30 to the pair of the cells 10. Accordingly, it is possible to remarkably ease forming the series circuit by constituting the series member 220 by using the pair of the cells 10.

Furthermore, the battery pack 1 may have the one series member 220a, and the other series member 220b which is stacked on the one series member 220a in a state where the other series member 220b is rotated in a direction crossing the stacking direction with respect to the one series member 220a. The bus bar 40 electrically connects the conductive member 30 electrically connected to the positive electrode tab 12a of the one series member 220a, and the conductive member 20 electrically connected to the negative electrode tab 12b of the other electrode series member 220b.

Similarly, in the method of manufacturing the battery pack 1, the other series member 220b may be stacked on the one series member 220a in a state where the other series member 220b is rotated in a direction crossing the stacking direction of the frames 20 with respect to the one series member 220a. In the conductive member connecting process, by using the bus bar 40, the conductive member 30 electrically connected to the positive electrode tab 12a of the one series member 220a, and the conductive member 30 electrically connected to the negative electrode tab 12b of the other series member 220b are electrically connected in series.

By the thus-constructed battery pack 1, and the method of manufacturing this battery pack 1, by the above-described simple structure, it is possible to further connect, in series, with the pairs of the cells 10 that are connected in series to correspond to required voltage. Accordingly, it is remarkably ease the handling when the battery pack 1 is formed.

Second Variation of First Embodiment

A battery pack 1 according to a second variation of the first embodiment is illustrated with reference to FIG. 11 to FIG. 13.

Figure 11:
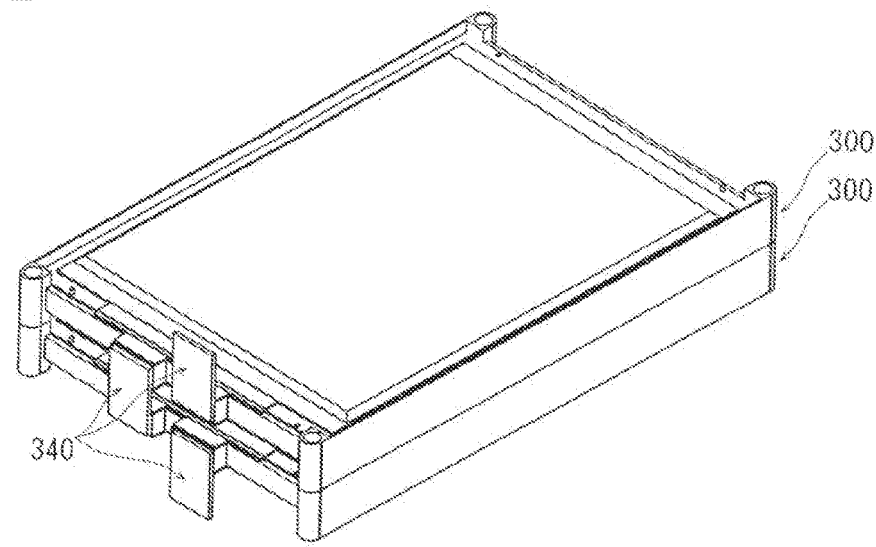
FIG. 11 is an exploded perspective view showing a state where a plurality of battery modules of a battery pack according to a second variation of the first embodiment are stacked.
Figure 12:
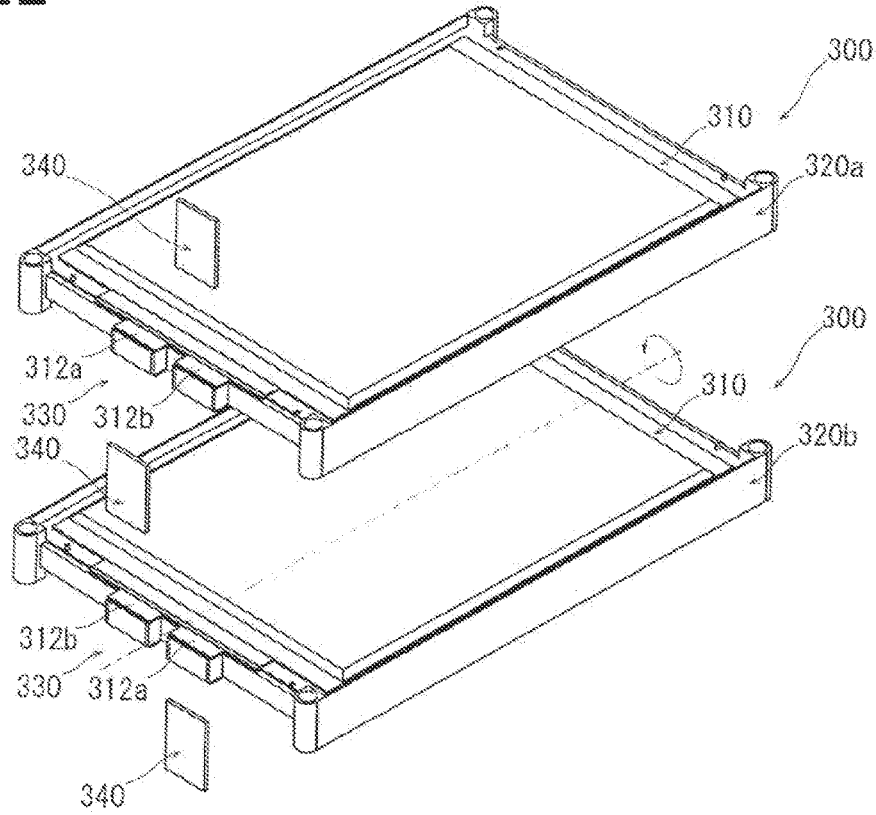
FIG. 12 is an exploded perspective view showing a state where a plurality of battery modules of the battery pack according to the second variation of the first embodiment are exploded.

FIG. 11 is an exploded perspective view showing a state where a plurality of battery modules 300 of the battery pack 1 are stacked. FIG. 12 is an exploded perspective view showing a state where the plurality of the battery modules 300 of the battery pack 1 are exploded. FIG. 13 is an exploded perspective view showing a state where one of the battery modules 300 of the batter pack 1 is exploded.

In the battery pack 1 according to the second variation of the first embodiment, the positive electrode tab 312a and the negative electrode tab 312b are protruded only from the one side of the outer member 311a, without protruding from the both sides 311a, unlike the structure of the above-described battery pack 1 according to the first embodiment.

In the second variation of the first embodiment, the structures identical to those of the above-described first embodiment have the same symbols. The above-described explanations are omitted.

FIG. 11 shows a state where the stacked battery modules 300 are connected by bus bars 340. In particular, as shown in FIG. 13, the pair of the cells 10 are electrically connected in parallel. Then, as shown in FIG. 12, two battery modules 300 are stacked. Each of the battery modules 300 includes cells 310, a frame member 320, a conductive member 330, and a bus bar 340. The cell 310, the frame member 320, the conductive member 330, and the bus bar 340 have basic structures which are identical to those of the cell 10, the frame member 20, the conductive member 30, and the bus bar 40, except for members relating to the electrode tab.

Figure 13:
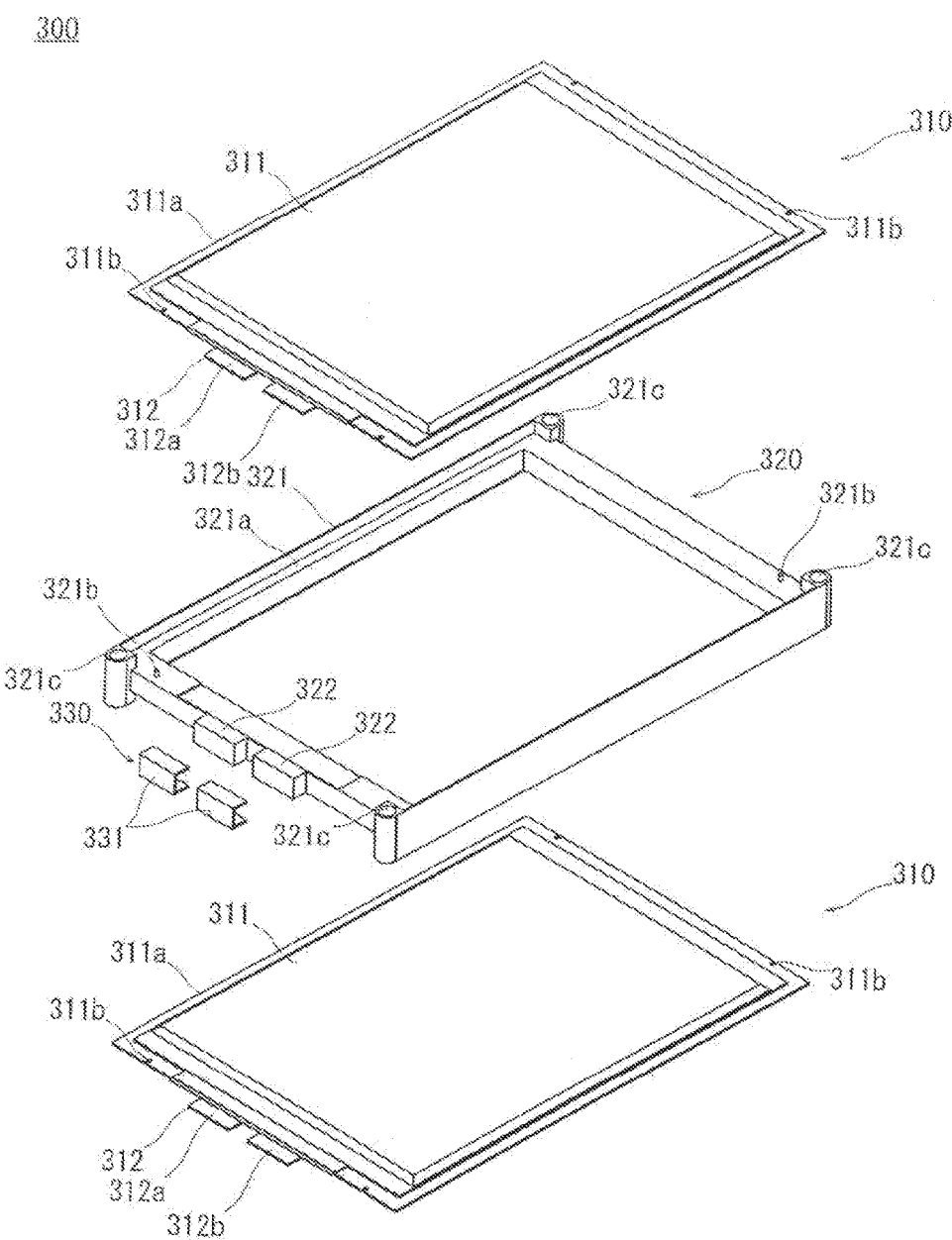
FIG. 13 is an exploded perspective view showing a state where the battery module of the battery pack according to the second variation of the first embodiment is exploded.

As shown in FIG. 13, in the cell 310, a positive electrode tab 312a and a negative electrode tab 312b are protruded, respectively, from the one side of the outer member 311a. In the frame member 320, two electrode tab connection portions 322 are protruded from one side. The conductive member 330 includes a pair of conductive materials 331 which are formed, respectively, into U-shapes. The pair of the conductive materials 331 are disposed on the two electrode tab connection portions 322, The other frame member 320b is stacked on the one frame member 320a in a state where the front surface and the back surface of the other frame member 320b are reversed with respect to the one frame member 320a, The bus bar 340 connects the conductive materials 331 which are disposed to be adjacent to each other in the upward and downward directions. In particular, the bus bar 340 connects the positive electrode tab 312a of the cell 310 mounted on the one frame member 320a, and the negative electrode tab 312b of the cell 310 mounted on the other frame member 320b, respectively, through the conductive material 331, in series.

By the above-described battery pack 2 according to the second variation of the first embodiment, the following effects and operations are obtained in addition to the effects and operations by the first embodiment and the first variation of the first embodiment.

In the cell 310, the positive electrode tab 312a and the negative electrode tab 312b are protruded, respectively, from the same end portion of the outer member 311a.

By the thus-constructed battery pack 1, it is possible to apply the present invention to a case where it is preferable to collect the power only from the one side of the battery pack 1, not from the both sides of the battery pack 1, for shape of the installation space, the avoidance from the interference with the other members, the insulation, and so on.

Moreover, the one frame member 320a, and the other frame member 320b whose the front surface side and the back surface side are inversed with respect to the one frame member 320a. The bus bar 340a electrically connects in series the conductive member 30 electrically connected with the positive electrode tab 12a of the cell 10 mounted on the one frame member 320a, and the conductive member 30 electrically connected with the negative electrode tab 12b of the cell 10 mounted on the other frame member 320b.

By the thus-constructed battery pack 1, even in the embodiment in which the power is collected from the one side of the battery pack 1, not from the both sides of the battery pack 1, it is possible to connect in series the pairs of the cells 10 which are connected in parallel.

Second Embodiment

A battery pack 2 according to a second embodiment is illustrated with reference to FIG. 14 to FIG. 16.

Figure 14:
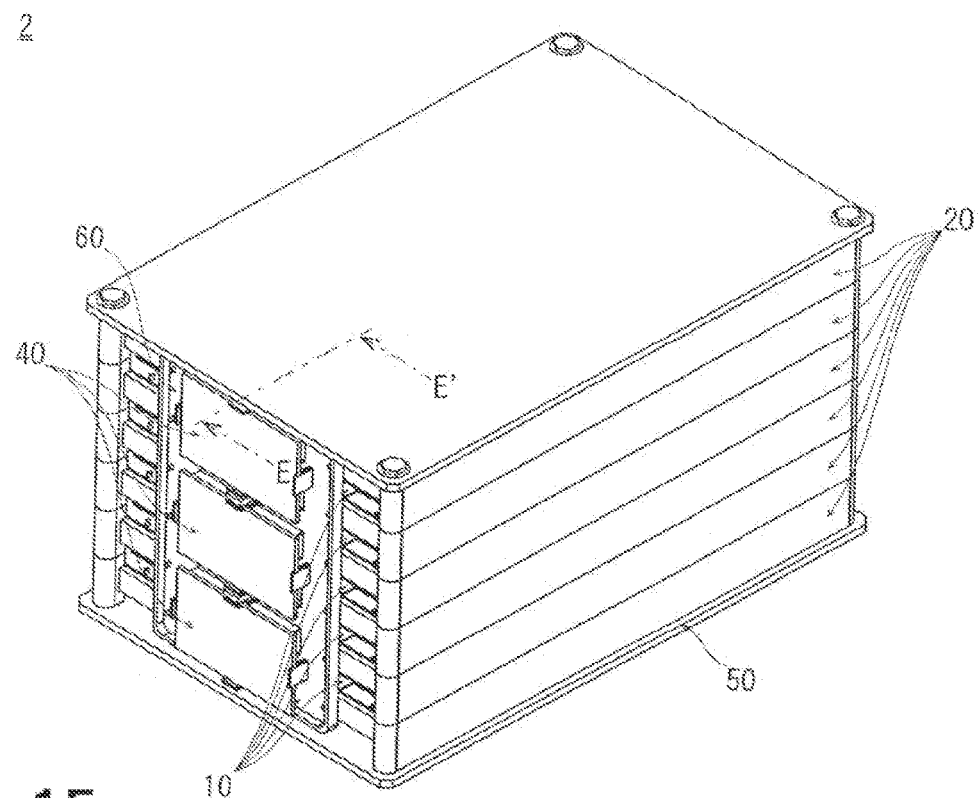
FIG. 14 is a perspective view showing a battery pack according to a second embodiment.

FIG. 14 is a perspective view showing the battery pack 2. FIG. 15 is an exploded perspective view showing a main part of the battery pack 2 which is exploded. FIG. 16 is an end elevation view showing a part of the battery pack 2 which is taken along a line E-E' shown in FIG. 14.

In the battery pack 2 according to the second embodiment, there is provided a connection member 60 connecting the bus bars 40, unlike the structure of the battery pack 1 according to the first embodiment.

In the second embodiment, the structures Identical to those of the above-described first embodiment have the same symbols. The above-described explanations are omitted.

As shown in FIG. 14, the connection member 60 connects the plurality of the bus bars 40 which are disposed in the stacking direction so that the bus bars 40 are electrically isolated with each other. The connection member 60 is made of, for example, plastic. The connection member 60 is formed into the rectangular shape. As shown in FIG. 15, the connection member 60 includes bus bar holding plate 61, and hook portions 62-64 which retain the bus bars 40.

Figure 15:
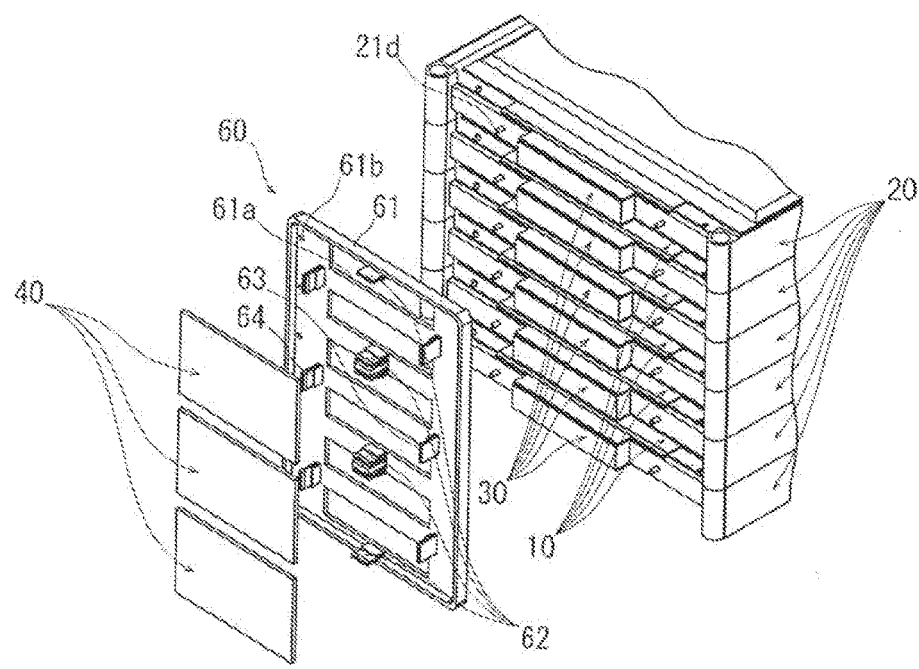
FIG. 15 is an exploded perspective view showing the battery pack according to the second embodiment.

As shown in FIG. 15, the bus bar holding plate 61 includes a plurality of insertion holes 61a. The electrode tab connection portions 22 of the frame members 20 are inserted into the insertion holes 61a. A positioning hole 61b is formed at an edge portion of the bus bar holding plate 61. A positioning protrusion 21d which is formed on the outer circumference surface of the frame member 20 is inserted into the positioning hole 61b. Each of the hook portions 62-64 is made, for example, of plastic. Each of the hook portions 62-64 is formed into a rectangular shape. A pair of hook portions 62 are provided at upper and lower portions of the insertion holes 61 of the bus bar holding plate 61 to confront each other. The pair of the hook portions 62 hold the bus bar 40 from the upward and downward directions. The hook portions 63 and 64 are provided on the left and right sides of the insertion holes 61a of the bus bar holding plate 61. The book portions 63 and 64 hold the bus bar 40 from the leftward and rightward directions.

Figure 16:
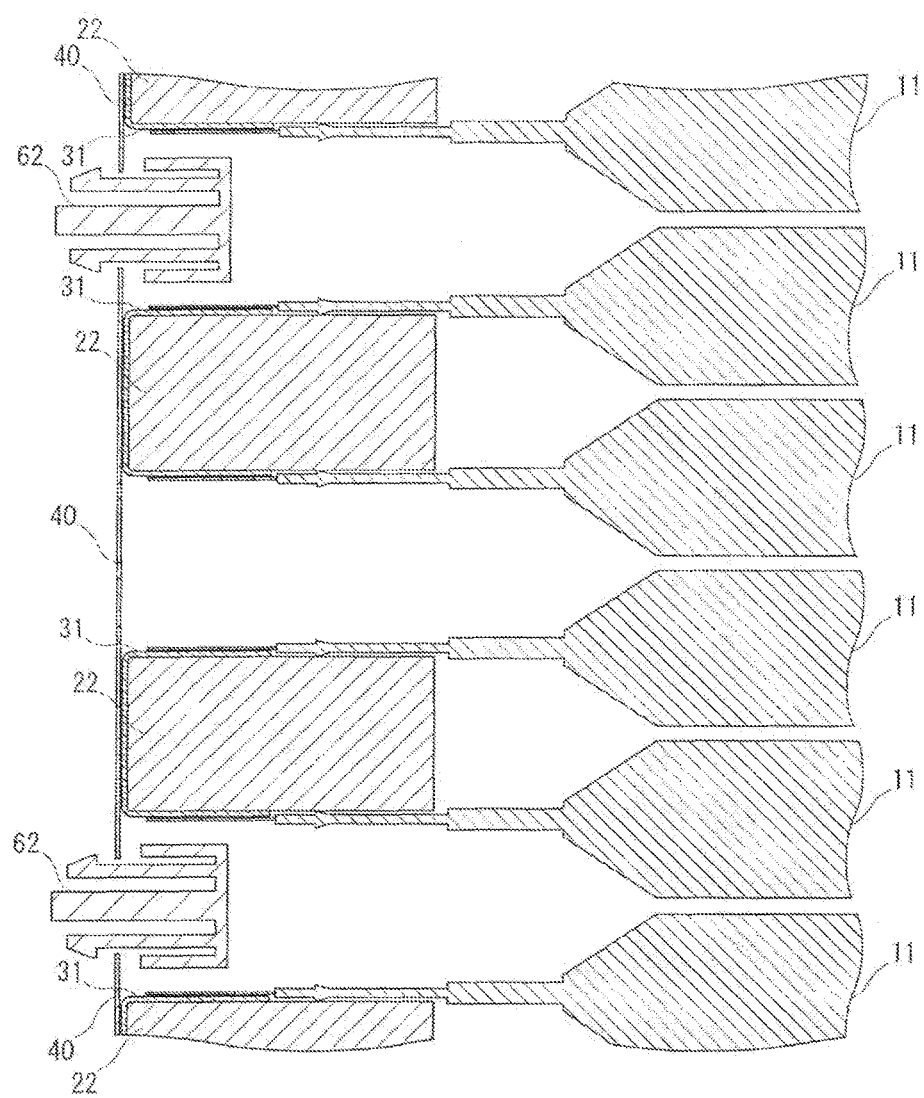
FIG. 16 is an end elevation view showing a main part of the battery pack according to the second embodiment.

As shown in FIG. 16, the hook portion 62 of the connection member 60 includes a plurality of cutout portions which are provided in directions crossing the stacking direction of the frame members 20. Accordingly, the book portions 62 of the connection member 60 bends the outer shape thereof by using the plurality of the cutout portions, so as to move the bus bars 40 in the stacking direction of the frame members 20, and thereby to hold the bus bars 40.

By the battery pack 2 according to the second embodiment, the following effects and operations are obtained in addition to the effects and operations according to the above-described first embodiment.

The battery pack 2 includes the connection member 60 connecting the plurality of the bus bars 40 disposed in the stacking direction so that the bus bars 40 are electrically isolated with each other.

By the thus-constructed battery pack 2, for example, in a state where the plurality of the bus bars 40 are connected to one connection member 60, it is possible to assemble that connection member 60 to the plurality of the stacked frame members 20. Accordingly, it is possible to ease the assembly operation of the battery pack 2, and to decrease the time period for assembling the battery pack 2.

Moreover, the connection member 60 may hold the bus bars 40 so that the bus bars 40 are moved in the stacking directions of the frame members 20.

By the thus-constructed battery pack 2, in a state where the plurality of the bus bars 40 are connected to the connection member 60, it is possible to relatively vary the positions of the plurality of the bus bars 40. Accordingly, in a case where there is generated a stacking error in the stacking direction of the frame members 20 by stacking the plurality of the frame members 20, and in a case where there is generated a size error of the one frame member 20, it is possible to absorb these errors through the bus bars 40 by the connection member 60. In this way, it is possible to assemble the battery pack 2, irrespective of the stacking error of the stacking direction of the plurality of the frame members 20, and the size error of the one frame member 20. Consequently, it is possible to improve the productivity of the battery pack 2.

Third Embodiment

A battery pack 3 according to a third embodiment is illustrated with reference to FIG. 17 to FIG. 19.

Figure 17:
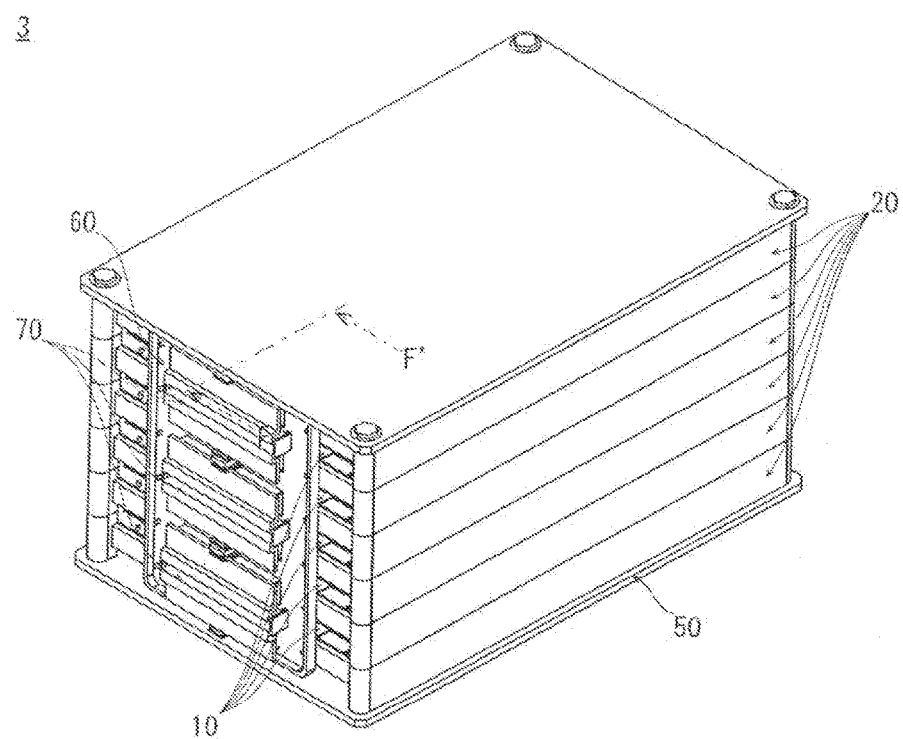
FIG. 17 is a perspective view showing a battery pack according to a third embodiment.

FIG. 17 is a perspective view showing the battery pack 3. FIG. 18 is an exploded perspective view showing a state where a main part of the battery pack 3 is exploded. FIG. 19 is a sectional view showing a part of the battery pack 3 shown in FIG. 17, which is taken along a line F-F'.

In the battery pack 3 according to the third embodiment, each of bus bars 70 includes shape varying portions 71-73 whose shape can be varied, unlike the structure of the above-described battery pack 2 according to the second embodiment.

In the third embodiment, the members identical to those of the first embodiment or the second embodiment have the same symbols. The above-described explanations are omitted.

Figure 18:
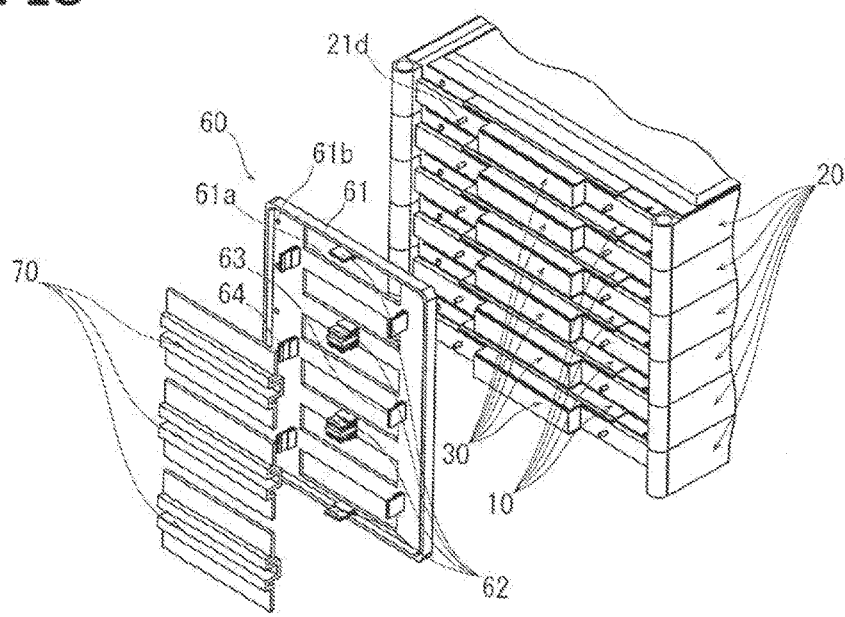
FIG. 18 is an exploded perspective view showing a state where a main part of the battery pack according to the third embodiment is exploded.
Figure 19:
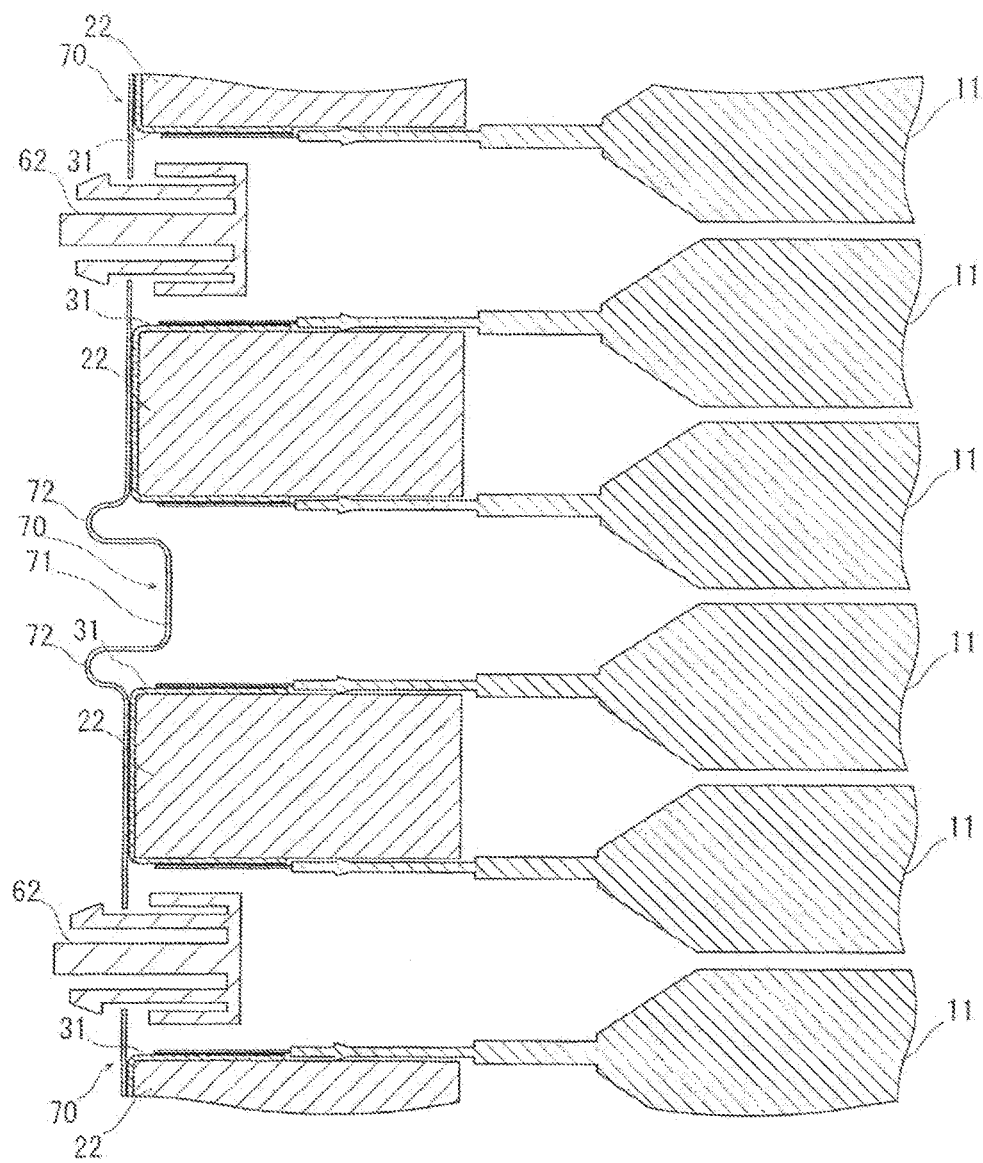
FIG. 19 is an end elevation view showing the main part of the battery pack according to the third embodiment.

As shown in FIG. 17 to FIG. 19, the bus bars 70 are electrically connected to the conductive members 30 in a state where the bus bars 70 are connected to the connection member 60. Each of the bus bars 70 is made of, for example, the copper alloy. Each of the bus bars 70 is formed into a plate shape having a plurality of bending portions. In particular, as shown in FIG. 19, each of the bus bars 70 includes a pair of shape varying portions 72 each of which is a raised portion raised in a direction that is a direction crossing the stacking direction of the frame members 20, and that is a direction to be apart from the frame members 20; and a shape varying portions 73 which is a raised portion which is raised in a direction to be close to the frame members 20. Each of the shape varying portions 73 is provided between the pair of the shape varying portions 72. Accordingly, each of the bus bars 70 can vary the shapes of the pair of the shape varying portion 72 and the shape varying portion 73 which are constituted like a plate spring having a recessed portion and a raised portion. The shape varying portions 71 to 73 can be used by elastically varying the shape by forming of the copper alloy as long as the shapes of the shape varying portions 71 to 73 are not plastically deformed beyond a predetermined variation amount.

By the above-described battery pack 3 according to the third embodiment, the following effects and operations can be attained in addition with the effects and the operations of the above-described first and second embodiments.

In the battery pack 3, each of the bus bars 70 includes the shape varying portions 71 to 73 whose the shapes can be varied in the stacking direction of the frame members 20.

By the thus-constructed battery pack 3, in a case where there is generated the stacking error in the stacking direction of the frame members 20 by stacking the plurality of the frame members 20 in the stacking direction, it is possible to absorb that stacking error by the shape varying portions 71 to 73 of the bus bars 70. Moreover, in a case where there is generated the size error of the frame members 20 itself, it is possible to absorb the size error by the shape varying portions 71 to 73 of the bus bar 70. Accordingly, it is possible to assemble the battery pack 3 independently of the stacking error in the stacking direction of the plurality of the frame members 20, and the size error of the single frame 20, and to improve the productivity of the battery pack 3.

Moreover, the shape varying portions 71 to 73 can be structure where the shapes of the shape varying portions 71 to 73 are elastically varied.

By the thus-constructed battery pack 3, in a case where the bus bars 70 are mounted to the connection member 60, then the bus bars 70 are once detached, and the bus bars 70 are mounted again, it is possible to vary the shapes of the shape varying portions 71 to 73 again.

Moreover, the present invention can be varied in various manners based on a structure described in claims. These are involved in the present invention.

The present invention is based on a Japanese Patent Application No. 2012-247634 filed Nov. 9, 2012. The disclosure of the Japanese Patent Application No. 2012-247634 is referred, and incorporated as a whole.

EXPLANATION OF SYMBOLS 1, 2, 3 battery pack
10, 310 cells
11, 311 battery main body
11a, 311a outer member
11b, 311b insertion hole
12, 312 electrode tab
12a, 312a positive electrode tab
12b, 312b negative electrode tab
20, 320, 320a, 320b frame member
21, 321 battery main body holding portion
21a, 321a holding portion
21b, 21d, 321b positioning protrusion
21c, 321c insertion hole
22, 322 electrode tab connection portion
30, 330 conductive member
31, 32, 33, 331 conductive material
31a, 32a, 33a connection portion
31b, 32b, 33b extension portion
40, 70, 340 bus bar
71, 72, 73 shape varying portion
50 tightening member
51 upper plate
51a insertion hole
52 lower plate
52a screw groove
53 tightening bolt
53a thread
60 connection member
61 bus bar holding plate
61a insertion hole
61b positioning hole
62, 63, 64 hook portion
110, 120, 300 battery module
210, 210a, 210b parallel member
220, 220a, 220b series member

The invention claimed is:

1. A battery pack comprising:
cells each including a battery main body in which a power generation element is received within an outer member, and electrode tabs including a positive electrode tab and a negative electrode tab which are connected with the power generation element, and which are provided to protrude from end portions of the outer member;
frame members each including a front surface and a back surface on which a pair of the cells are mounted;
conductive members each of which is disposed on a frame member, each of which electrically connects electrode tabs of the pair of the cells, and each of which includes connection portions that extend, respectively, along the front surface and the back surface of one of the frame members, and that are connected, respectively, with the electrode tabs of the pair of the cells, and an extension portion connecting the connection portions; and
a bus bar which electrically connects the conductive members disposed on the frame members of the plurality of the frame members, and which are adjacent in a stacking direction of the frame members.

2. The battery pack as claimed in claim 1, wherein the positive electrode tabs which are adjacent to each other in the stacking direction of the frame members are connected through one of the conductive members, the negative electrode tabs which are adjacent to each other in the stacking direction of the frame members are connected through another of the conductive members, so as to constitute a parallel member in which the pair of the cells are electrically connected in parallel with each other.

3. The battery pack as claimed in claim 2, wherein the battery pack further comprises one parallel member, and another parallel member which is stacked on the one parallel member; the another parallel member is stacked on the one parallel member in a state the another parallel member is rotated with respect to the one parallel member so that the conductive member electrically connecting the positive electrode tabs of the one parallel member, and the conductive member electrically connecting the negative electrode tabs of the another parallel member are adjacent to each other in the stacking direction of the frame members; the bus bar electrically connects, in series, the conductive member electrically connecting the positive electrode tabs of the one parallel member, and the conducive member electrically connecting the negative electrode tabs of the another parallel member.

4. The battery pack as claimed in claim 1, wherein the battery pack further comprises a series member in which a positive electrode tab and a negative electrode tab which are adjacent to each other in the stacking direction of the frame members electrically connect, in series, the pair of the cells.

5. The battery pack as claimed in claim 1, wherein each cell in the pair of the cells includes the positive electrode tab and the negative electrode tab which are protruded from the same end portion of the outer member.

6. The battery pack as claimed in claim 5, wherein one frame member, and another frame member have the front surface side and the back surface side inversed; and the bus bar electrically connects, in series, a conductive member electrically connected to a positive electrode tab of a cell mounted on the one frame member, and a conductive member electrically connected to the negative electrode tab of a cell mounted on the another frame member.

7. The battery pack as claimed in claim 1, wherein each frame member has a frame shape penetration so that the pair of the cells confront each other.

8. The battery pack as claimed in claim 1, wherein the battery pack further comprises a connection member connecting a plurality of bus bars disposed in the stacking direction of the frame members so that the plurality of the bus bars are electrically isolated from each other.

9. The battery pack as claimed in claim 8, wherein each connection member is arranged to hold the bus bars so that the bus bars are moved in the stacking direction of the frame members.

10. The battery pack as claimed in claim 8, wherein a bus bar includes a shape varying portion arranged to vary a shape in the stacking direction of the frame members.

11. The battery pack as claimed in claim 10, wherein the shape varying portion is arranged to elastically vary the shape.

12. A method of manufacturing a battery pack comprising:
preparing a cell including a battery main body which is formed by receiving a power generation element in an outer member, electrode tabs including a positive electrode tab and a negative electrode tab which are protruded from an end portion of the outer member;
a cell holding process of mounting a pair of cells on a front surface and back surface of a frame member;
an electrode tab connecting process of electrically connecting the electrode tabs of the pair of the cells by using a conductive member disposed to the frame member; and
a conductive member connecting process of electrically connecting conductive members disposed on frame members of a plurality of stacked frame members, which are adjacent to each other, by using a bus bar,
wherein each of the conductive members includes connection portions that extend, respectively, along a front surface and a back surface of one of the frame members, and are connected, respectively, with the electrode tabs of the pair of the cells, and
wherein the connection portions are connected by an extension portion.

13. The method of manufacturing the battery pack as claimed in claim 12, wherein the electrode tab connecting process is configured to connect the positive electrode tabs which are adjacent to each other in a stacking direction of the frame members by using the conductive members, to connect the negative electrode tabs, and thereby to electrically connect in parallel the pair of the cells to constitute a parallel member.

14. The method of manufacturing the battery pack as claimed in claim 13, wherein the conductive member connecting process is configured to electrically connect, in series, the conductive member electrically connecting the positive electrode tabs of one parallel member, and the conductive member electrically connecting the negative electrode tabs of another parallel member by using the bus bar, after the another parallel member is stacked on the one parallel member in a state where the another parallel member is rotated with respect to the one parallel member so that the conductive member electrically connecting the positive electrode tabs of the one parallel member, and the conductive member electrically connecting the negative electrode tabs of the another parallel member are adjacent to each other in the stacking direction of the frame members.

15. The method of manufacturing the battery pack as claimed in claim 12, wherein the electrode tab connecting process is configured to connect the positive electrode tab and the negative electrode tab which are adjacent to each other in the stacking direction of the frame members, by using the conductive member, and thereby to electrically connect the pair of the cells to constitute a series member.

16. The battery pack as claimed in claim 1, wherein each of the conductive members is U-shaped.

17. The battery pack as claimed in claim 1,
wherein each conductive member comprises a first connection portion, a second connection portion, and the extension portion provided therebetween, and
wherein the first connection portion and the second connection portion are parallel with respect to one another, and the extension portion is perpendicular to the first connection portion and the second connection portion.

* * * * *